US012718123B2

(12) United States Patent
Fujiwara et al.

(10) Patent No.: US 12,718,123 B2
(45) Date of Patent: Aug. 25, 2026

(54) INFORMATION PROCESSING APPARATUS, INFORMATION PROCESSING SYSTEM, AND INFORMATION PROCESSING METHOD

(71) Applicant: Hitachi, Ltd., Tokyo (JP)

(72) Inventors: Keisei Fujiwara, Tokyo (JP); Hisayoshi Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 727 days.

(21) Appl. No.: 18/027,970

(22) PCT Filed: Nov. 22, 2021

(86) PCT No.: PCT/JP2021/042859

§ 371 (c)(1),
(2) Date: Mar. 23, 2023

(87) PCT Pub. No.: WO2022/137944

PCT Pub. Date: Jun. 30, 2022

(65) Prior Publication Data

US 2023/0376802 A1 Nov. 23, 2023

(30) Foreign Application Priority Data

Dec. 22, 2020 (JP) ................................ 2020-212273

(51) Int. Cl.
*G06N 5/04* (2023.01)
*G06F 21/53* (2013.01)
(Continued)

(52) U.S. Cl.
CPC ............... *G06N 5/04* (2013.01); *G06F 21/53* (2013.01); *G06F 21/6281* (2013.01);
(Continued)

(58) Field of Classification Search
CPC ........ G06N 5/04; G06N 3/0464; G06N 3/098; G06N 3/045; G06F 21/53; G06F 21/6281; G06F 21/6245
See application file for complete search history.

(56) References Cited

U.S. PATENT DOCUMENTS

2017/0024135 A1* 1/2017 Christodorescu ..... G06F 21/552
2018/0074814 A1* 3/2018 Ganta ....................... G06F 8/71
(Continued)

OTHER PUBLICATIONS

Narra, Krishna Giri, et al. "Privacy-preserving inference in machine learning services using trusted execution environments." arXiv preprint arXiv:1912.03485 (2019) (Year: 2019).*
(Continued)

*Primary Examiner* — Shahid K Khan
(74) *Attorney, Agent, or Firm* — MATTINGLY & MALUR, PC

(57) ABSTRACT

An information processing apparatus that executes machine learning by a plurality of processing layers includes a processor and a memory, a normal region of the memory holds a parameter of the machine learning, an isolation region isolated from the normal region of the memory holds input data to an i-th layer included in the plurality of processing layers and a parameter of the machine learning, the processor determines whether there is a risk in executing processing of the i-th layer for the input data in the normal region based on a content of secret information of the input data in the isolation region, when determining that there is the risk, executes the processing of the i-th layer for the input data in the isolation region, and when determining that there is no risk, executes the processing of the i-th layer for the input data in the normal region.

7 Claims, 6 Drawing Sheets

(51) Int. Cl.
*G06F 21/62* (2013.01)
*G06N 3/045* (2023.01)
*G06N 3/0464* (2023.01)

(52) U.S. Cl.
CPC ......... *G06N 3/045* (2023.01); *G06F 21/6245* (2013.01); *G06N 3/0464* (2023.01)

(56) References Cited

U.S. PATENT DOCUMENTS

| | | | | |
|---|---|---|---|---|
| 2019/0384790 | A1* | 12/2019 | Bequet | G06N 3/098 |
| 2019/0392305 | A1* | 12/2019 | Gu | G06N 3/08 |
| 2020/0082259 | A1 | 3/2020 | Gu et al. | |
| 2020/0134630 | A1* | 4/2020 | Xia | H04L 9/40 |
| 2020/0184070 | A1* | 6/2020 | Kim | G06F 8/73 |
| 2020/0241716 | A1* | 7/2020 | Sowden | G06N 3/082 |
| 2021/0232895 | A1* | 7/2021 | Kokiopoulou | G06N 3/044 |

OTHER PUBLICATIONS

Mo, Fan, et al. "Darknetz: towards model privacy at the edge using trusted execution environments." Proceedings of the 18th International Conference on Mobile Systems, Applications, and Services. 2020 (Year: 2020).*

International Search Report of PCT/JP2021/042859 dated Feb. 15, 2022.

* cited by examiner

FIG. 3

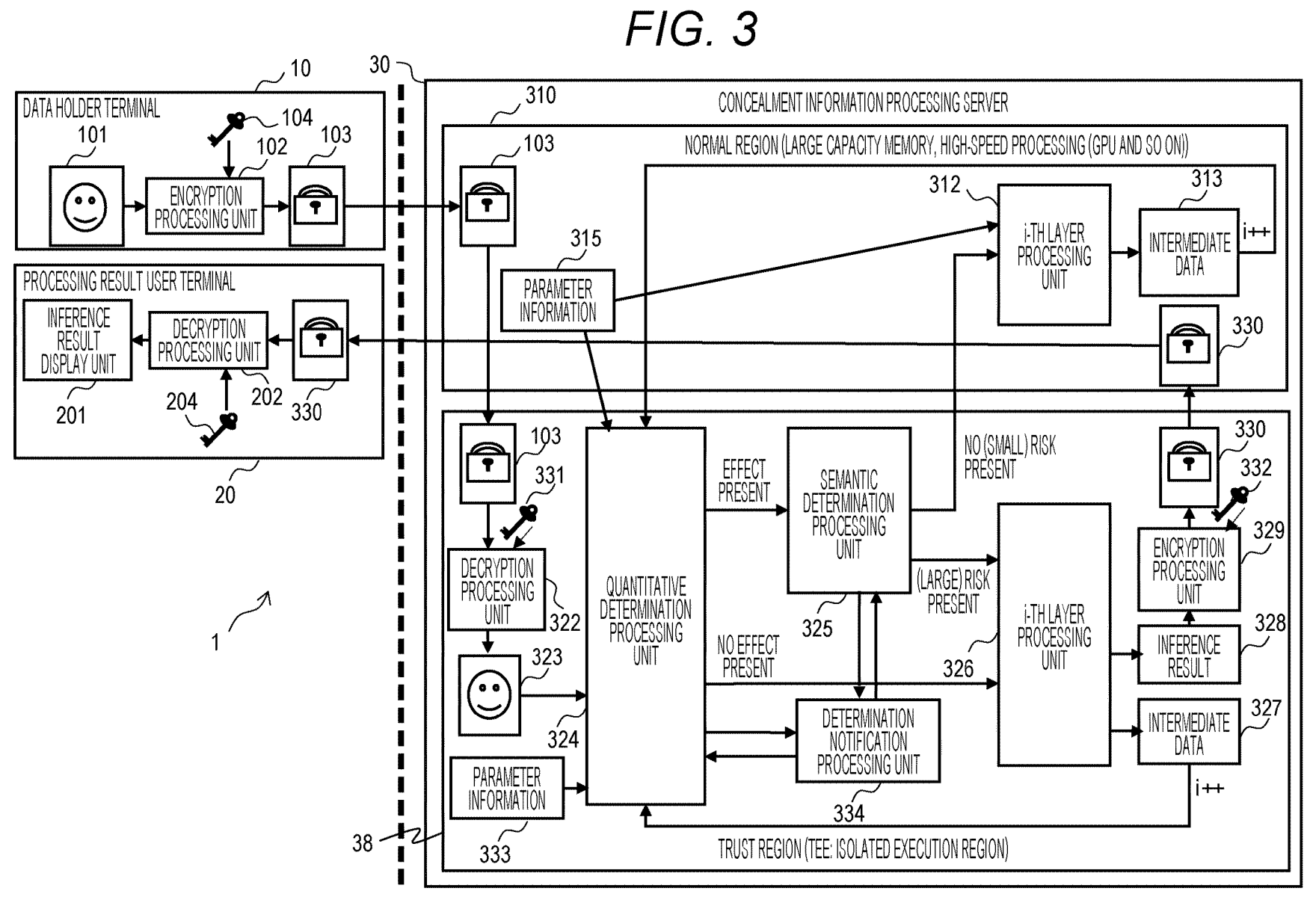

CONCEALMENT INFORMATION PROCESSING SERVER
NORMAL REGION (LARGE CAPACITY MEMORY, HIGH-SPEED PROCESSING (GPU AND SO ON))
TRUST REGION (TEE: ISOLATED EXECUTION REGION)
DATA HOLDER TERMINAL
PROCESSING RESULT USER TERMINAL
ENCRYPTION PROCESSING UNIT
DECRYPTION PROCESSING UNIT
INFERENCE RESULT DISPLAY UNIT
PARAMETER INFORMATION
i-TH LAYER PROCESSING UNIT
INTERMEDIATE DATA
i++
QUANTITATIVE DETERMINATION PROCESSING UNIT
SEMANTIC DETERMINATION PROCESSING UNIT
DETERMINATION NOTIFICATION PROCESSING UNIT
EFFECT PRESENT
NO EFFECT PRESENT
NO (SMALL) RISK PRESENT
(LARGE) RISK PRESENT
INFERENCE RESULT
1
10
20
30
38
101
102
103
104
201
202
204
310
312
313
315
322
323
324
325
326
327
328
329
330
331
332
333
334

INFORMATION PROCESSING APPARATUS, INFORMATION PROCESSING SYSTEM, AND INFORMATION PROCESSING METHOD

INCORPORATION BY REFERENCE

This application claims priority to Japanese Patent Application No. 2020-212273 filed on Dec. 22, 2020, the content of which is incorporated herein by reference.

TECHNICAL FIELD

The present invention relates to an information processing apparatus, an information processing system, and an information processing method.

BACKGROUND ART

In December 2016, the Basic Act on the Advancement of Public and Private Sector Data Utilization, which promotes appropriate utilization of public and private sector data related to individuals by a wide variety of actors, was promulgated and came into effect. In December 2018, the acceptance of certification applications at information banks was started, and personal data utilization schemes in cooperation with the public and private sectors have been developed. The Ministry of Internal Affairs and Communications has made clear that the first information bank will be certified in March 2019.

On the other hand, as a regulation for protecting personal privacy information, Japan fully implemented the revised Act on the Protection of Personal Information in May 2017, and in overseas, Europe started implementation of the EU General Data Protection Regulation (GDPR) was in May 2018, so that the regulation is being strengthened worldwide.

Under such circumstances, creation of new values is promoted, where various types of information are cooperated, such as cooperation of public services in which public and private sectors such as an emergency and a security company cooperate in terms of information, and cooperation of private services such as pharmaceutical, insurance, transportation, and information bank that produce a synergistic effect with the public services. In order to analyze various data and create a new value, statistical analysis such as regression analysis and analysis processing such as machine learning are effective. Furthermore, in order to achieve these services, there is a demand for a concealment information processing technology that enables providers of public services or private services to analyze and utilize, while protecting personal privacy, confidential information such as personal information owned by data holders such as hospitals and banks.

The conventional concealment information processing technology enables certain processing while keeping data encrypted, thereby achieving concealment of confidential information such as personal information. However, processing that can be executed by the conventional concealment information processing technology is limited to basic computation such as search and order comparison, and there is a limit in the degree of freedom of processing. The encryption technology such as homomorphic encryption having no limit in the degree of freedom of processing cannot be achieved at a practical processing speed. For this reason, there is a demand for concealment information processing compatible to advanced statistical processing and machine learning requiring a high degree of freedom of processing.

In recent years, a main central processing unit (CPU) has been mounted with a trusted execution environment (TEE) function as a standard. It is considered that the TEE function is effective for processing of concealment information. The TEE function is a function of providing a computer with a trust region in which information cannot be read even if the administrator authority of the OS is deprived, and by decrypting and processing encrypted data only in the trust region, advanced processing is safely enabled.

Technologies for using the trust region of the TEE function includes US 2020/0082259 A (PTL 1). PTL 1 discloses a privacy-enhanced deep learning system that reduces information leakage of confidential input data in an inference pipeline.

The technology described in PTL 1 uses a hierarchical structure of a neural network to divide each deep learning model into FrontNet to be processed in a trust region and BackNet to be processed in a normal region.

In the technology described in PTL 1, a terminal used by an end user transmits an encrypted input and encrypted FrontNet to the system. The technology described in PTL 1 uses the TEE function on the cloud infrastructure to perform deep learning processing in the enclave (isolated execution process in the TEE function) of FrontNet, and cryptographically protects the confidentiality and integrity of user input.

On the other hand, the technology described in PTL 1 gains benefits due to improvement in performance in a case where a safe enclave is insufficient in inference calculation of BackNet and the cloud machine is mounted with a deep learning acceleration chip.

In order to determine a model-specific optimal division point that balances privacy protection and performance requirements, the technology described in PTL 1 uses the hierarchical structure of the neural network and partitions each deep learning model into FrontNet and BackNet. In the technology described in PTL 1, a deep learning inference system measures similarity for each set of intermediate data of each layer, and uses a selected subset of the intermediate data that is most similar to the input information to determine a division point used for division into two partitions.

CITATION LIST

Patent Literature

PTL 1: US 2020/0082259 A

SUMMARY OF INVENTION

Technical Problem

However, there is a case where the system described in PTL 1 cannot prevent leakage of confidential information at the time of deep learning processing of input information in a case where the input information includes confidential information such as personal privacy information or trade secrets that have not been learned in the learning stage. For example, in a case where the input information used for learning for determining the division point includes an image of an individual, an image of a component, or character information corresponding to personal information and a trade secret, there is a case where intermediate data including these pieces of information is processed by BackNet that is not protected by the enclave.

Therefore, an object of one aspect of the present invention is to protect confidential information such as information regarding personal privacy and a trade secret included in input information at the time of processing such as machine learning by a plurality of processing layers.

Solution to Problem

In order to solve the above problems, one aspect of the present invention employs the following configuration. An information processing apparatus that executes machine learning by a plurality of processing layers includes a processor and a memory, in which the memory includes a normal region and an isolation region isolated from the normal region, the normal region holds a parameter of the machine learning, the isolation region holds input data to an i-th layer included in the plurality of processing layers and a parameter of the machine learning, the processor executes semantic determination processing of determining whether there is a risk in executing processing of the i-th layer for the input data in the normal region on the basis of a content of secret information of the input data in the isolation region, when determining that there is the risk, executes the processing of the i-th layer for the input data on the basis of the parameter held by the isolation region in the isolation region, and when determining that there is no risk, outputs the input data to the normal region, and executes the processing of the i-th layer for the input data on the basis of the parameter held by the normal region in the normal region.

Advantageous Effects of Invention

According to one aspect of the present invention, it is possible to protect confidential information such as information regarding personal privacy and a trade secret included in input information at the time of processing such as machine learning by a plurality of processing layers.

Problems, configurations, and effects other than those described above will be clarified by the following description of embodiments.

BRIEF DESCRIPTION OF DRAWINGS

FIG. 3 is an explanatory diagram illustrating a functional configuration example and an example of a data processing flow for concealment inference processing in the first embodiment.

DESCRIPTION OF EMBODIMENTS

Embodiments of the present invention will be described in detail below with reference to the accompanying drawings. In the present embodiment, the same components are in principle given the same reference signs, and a repeated description thereof will be omitted. Note that the present embodiment is merely an example for achieving the present invention and does not limit the technical scope of the present invention.

(1) First Embodiment

(1-1) Configuration Example of Concealment Information Processing System

Figure 1:
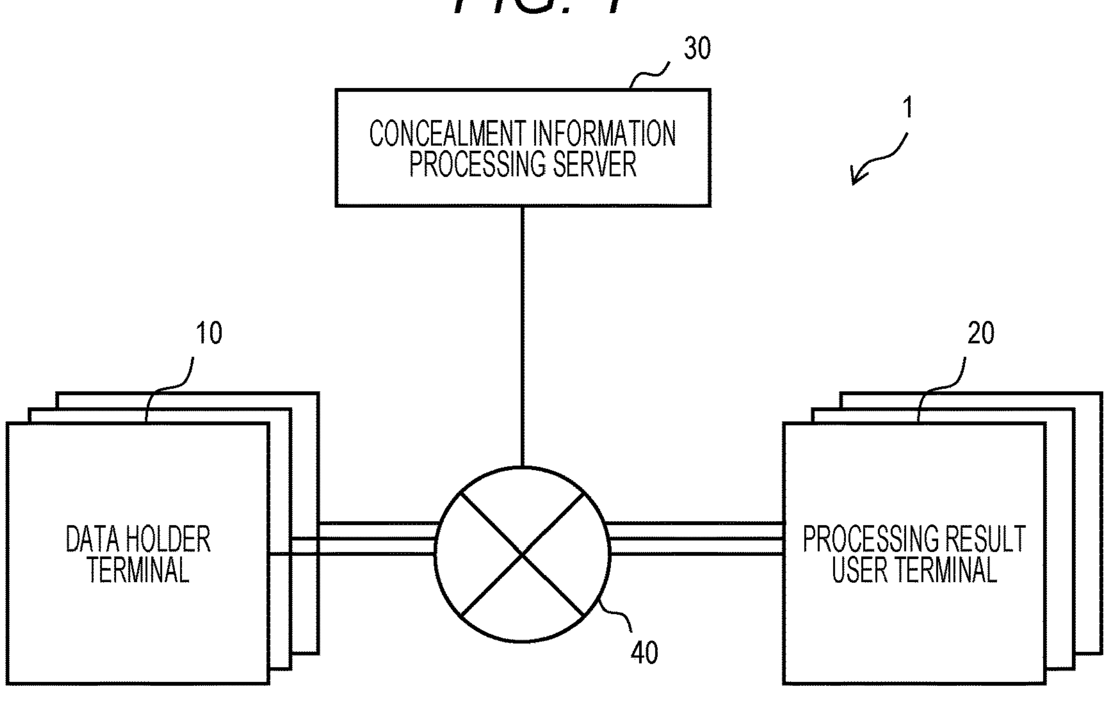
FIG. 1 is a block diagram illustrating a system configuration example of a concealment information processing system in a first embodiment.

FIG. 1 is a block diagram illustrating a system configuration example of the concealment information processing system. A concealment information processing system 1 deposits encrypted data from a data holder holding confidential information such as personal information, processes the deposited data in response to a processing request of a processing result user while keeping the confidential information concealed, and provides the processing result to the processing result user.

The concealment information processing system 1 includes, for example, a data holder terminal 10 used by a data holder to encrypt and deposit data, a processing result user terminal 20 with which a processing result user generates and transmits a processing request and refers to a processing result, and a concealment information processing server 30 that executes processing of the processing request received from the processing result user for the data deposited from the data holder while keeping the processing concealed and transmits the processing result. The data holder terminal 10, the processing result user terminal 20, and the concealment information processing server 30 are connected to one another via a network 40 such as the Internet.

The concealment information processing system 1 may include a plurality of the data holder terminals 10 or a plurality of the processing result user terminals 20. The data holder terminal 10 and the processing result user terminal 20 may be the same terminal.

Figure 2:
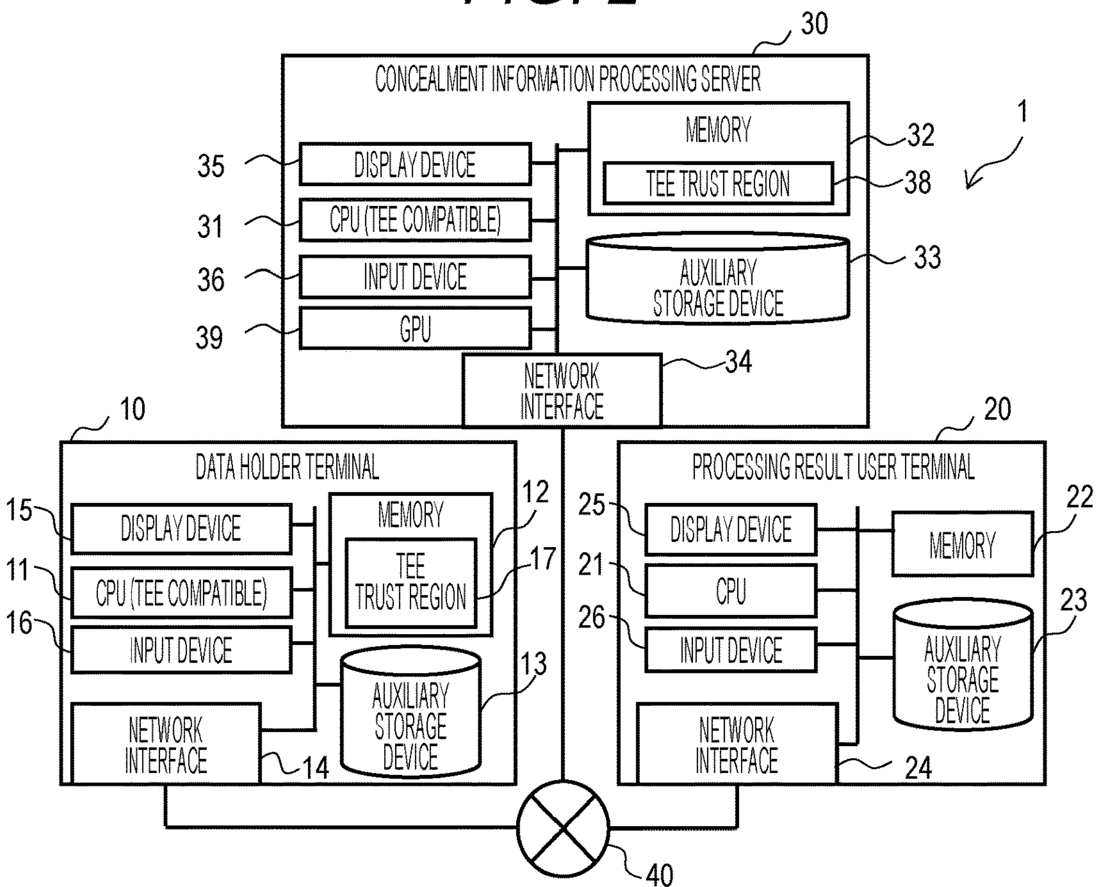
FIG. 2 is a block diagram illustrating a hardware configuration example of the concealment information processing system in the first embodiment.

FIG. 2 is a block diagram illustrating a hardware configuration example of the concealment information processing system 1. The data holder terminal 10 is, for example, a computer such as a personal computer, a smartphone, or a server device, or a virtual computer. The data holder terminal 10 includes, for example, a computer including a control processing unit (CPU) 11, a memory 12, an auxiliary storage device 13, a network interface 14, a display device 15, and an input device 16, which are connected to one another via an internal communication line.

The CPU 11 includes a processor and executes a program stored in the memory 12. The memory 12 includes a read only memory (ROM), which is a nonvolatile storage element, and a random access memory (RAM), which is a volatile storage element. The ROM stores an immutable program (e.g., basic input/output system (BIOS)) and the like. The RAM is a high-speed and volatile storage element such as a dynamic random access memory (DRAM), and temporarily stores a program executed by the CPU 11 and data used when the program is executed.

The CPU 11 is a TEE-compatible CPU having a trusted execution environment (TEE) function, and the memory 12 has a TEE trust region 17 that is a hardware trust region secured on the memory by the TEE-compatible CPU 21 and is isolated from other regions on the memory. In the first embodiment, the CPU 11 needs not have the TEE function, and the memory 12 needs not have a TEE trust region 17.

The memory amount that can be handled in the TEE trust region 17 may be limited to be smaller than the memory amount in the normal region (for example, about 128 MB), and in this case, when executing processing on the TEE trust region 17, the CPU 11 has the processing speed lowered as compared with that in a case of executing the processing on the normal region.

The auxiliary storage device 13 is, for example, a large-capacity and nonvolatile storage device such as a magnetic storage device (hard disk drive (HDD)) or a flash memory (solid state drive (SSD)), and stores a program executed by the CPU 11 and data used when the program is executed. That is, the program is read from the auxiliary storage device 13, loaded into the memory 12, and executed by the CPU 11.

The display device 15 is a device that outputs the execution result of the program in a format that can be visually recognized by an operator, such as a display or a printer. The input device 16 is a device that receives input from the operator, such as a keyboard or a mouse. The network interface 14 controls communication with other devices according to a predetermined protocol. The network interface 14 may include a serial interface such as a USB, for example.

The program executed by the CPU 11 may be stored in advance in the nonvolatile auxiliary storage device 13, which is a computer-readable non-transitory storage medium, or may be provided from a removable medium (CD-ROM, flash memory, or the like) that is a non-transitory storage medium or a non-transitory storage device of another device to the data holder terminal 10 via a network and stored in the auxiliary storage device 13. Therefore, the data holder terminal 10 preferably has an interface for reading data from a removable medium. The same applies to the processing result user terminal 20 and the concealment information processing server 30.

Some or all of the functions of the functional units executed by the CPU and a GPU in the present embodiment may be achieved by hardware such as an application specific integrated circuit (ASIC) or a field-programmable gate array (FPGA), for example.

In the present embodiment, the information used by the concealment information processing system 1 may be expressed in any data structure no depending on the data structure, and for example, a data structure appropriately selected from a list, a table, a database, or a queue can store the information.

The processing result user terminal 20 is, for example, a computer such as a personal computer, a smartphone, or a server device, or a virtual computer. The processing result user terminal 20 includes, for example, a computer including a CPU 21, a memory 22, an auxiliary storage device 23, a network interface 24, a display device 25, and an input device 26, which are connected to one another via an internal communication line.

The description of the CPU 21, the memory 22, the auxiliary storage device 23, the network interface 24, the display device 25, and the input device 26 as hardware is similar to the description of the CPU 11, the memory 12, the auxiliary storage device 13, the network interface 14, the display device 15, and the input device 16, respectively, as hardware. However, the CPU 21 does not need to have the TEE function, and it is not necessary to construct a trust region in the memory 22.

The concealment information processing server 30 is, for example, a computer such as a personal computer, a smartphone, or a server device, or a virtual computer. The concealment information processing server 30 includes, for example, a computer including a CPU 31, a memory 32, an auxiliary storage device 33, a network interface 34, a display device 35, an input device 36, and a graphics processing unit (GPU) 39, which are connected to one another via an internal communication line such as a bus.

The description of the CPU 31, the memory 32, the auxiliary storage device 33, the network interface 34, the display device 35, and the input device 36 as hardware is similar to the description of the CPU 11, the memory 12, the auxiliary storage device 13, the network interface 14, the display device 15, and the input device 16, respectively, as hardware. However, the CPU 31 of the concealment information processing server 30 is a TEE-compatible CPU having a TEE function, and the memory 32 of the concealment information processing server 30 is a hardware trust region secured on the memory by the TEE-compatible CPU 31 and includes a TEE trust region 38, which is an execution region isolated from other regions on the memory. The GPU 39 includes a processor and executes, at high speed, the program stored in the memory 32, using a region (normal region) out of the TEE trust region 38 of the memory 32. The concealment information processing server 30 needs not include the GPU 39.

Although the data holder terminal 10 and the concealment information processing server 30 have the TEE function in the present embodiment, a method different from the TEE function may be adopted, in which computation can be performed in a safe execution region isolated from the normal region on the memory.

Part or entire processing executed by the CPU 11, the CPU 21, the CPU 31, and the GPU 39 may be executed by hardware such as the application specific integrated circuit (ASIC) or the field-programmable gate array (FPGA), for example.

Each of the data holder terminal 10, the processing result user terminal 20, and the concealment information processing server 30 is a computer system configured physically on one computer or on a plurality of computers configured logically or physically, and may operate on separate threads on the same computer or may operate on a virtual computer constructed on a plurality of physical computer resources.

The network 40 is a communication network such as the Internet by wired communication or wireless communication, an intranet such as an in-house network, or a satellite line.

(1-2) Functional Configuration Example of Concealment Information Processing System and Data Processing Example of Concealment Inference Processing FIG. 3 is an explanatory diagram illustrating a functional configuration example and an example of a data processing flow for concealment inference processing.

First, the entire concealment inference processing executed by the concealment information processing system 1 according to the present embodiment will be described. In the concealment information processing system 1, the data holder terminal 10 encrypts and transmits, to the concealment information processing server 30, input data including confidential information such as personal information.

Next, the concealment information processing server 30 decrypts the input data in the TEE trust region 38, executes, in the TEE trust region 38 or the normal region according to the results of the quantitative determination processing and the semantic determination processing, processing of each layer of the deep learning inference processing including a plurality of processing layers, encrypts the inference result, and transmits the encrypted inference result to the processing result user terminal 20. Then, the processing result user terminal 20 decrypts the received encrypted inference result and acquires the inference result.

Hereinafter, a functional configuration example and an example of a data processing flow will be described in detail with reference to FIG. 3 for each processing described above.

The concealment information processing server 30 includes, for example, a normal region 310 on the memory 32 for performing high-speed processing by a normal CPU, a memory, and an acceleration chip such as a GPU, and the TEE trust region 38 on the memory 32, which is a highly safely isolated processing execution region provided by the TEE function or the like of the CPU.

The normal region 310 includes, for example, an i-th layer processing unit 312, a quantitative determination processing unit 324, and a semantic determination processing unit 325. The i-th layer processing unit 312 executes processing of a layer in machine learning (convolutional neural network (CNN) will be described below as an example) of a multi-layer structure such as a CNN. The quantitative determination processing unit 324 executes quantitative determination processing based on the calculation amount, the data input/output time, and the like of data processing to be executed next in the TEE trust region 38. The semantic determination processing unit 325 executes semantic determination processing such as determination of privacy risk in data processing to be executed next in the TEE trust region 38.

The TEE trust region 38 includes, for example, an i-th layer processing unit 326, a decryption processing unit 322, a determination notification processing unit 334, and an encryption processing unit 329. The i-th layer processing unit 326 executes processing of the CNN layer. The decryption processing unit 322 decrypts the encrypted data using an encryption key 331 stored in the TEE trust region 38.

The determination notification processing unit 334 notifies the processing result user terminal 20 or the data holder terminal 10 of the determination content of the quantitative determination processing unit 324 or the semantic determination processing unit 325. The determination notification processing unit 334 notifies the quantitative determination processing unit 324 or the semantic determination processing unit 325 of the determination of the processing result user terminal 20 or the data holder terminal 10 in response to designation. The encryption processing unit 329 encrypts the inference result that is the final result of the CNN processing with an encryption key 332.

The data holder terminal 10 includes an encryption processing unit 102 that encrypts data using an encryption key 104 stored in the memory 12, the auxiliary storage device 13, or the TEE trust region 17. The processing result user terminal 20 includes a decryption processing unit 202 that decrypts data using an encryption key 204 stored in the memory 22 or the auxiliary storage device 23. The data holder terminal 10 and the processing result user terminal may be the same terminal, and in that case, the encryption processing unit 102 and the decryption processing unit 202 are included in the same terminal.

For example, the TEE-compatible CPU 31 executes processing as the decryption processing unit 322 by operating in accordance with the decryption processing program loaded in the TEE trust region 38 of the memory 32, executes processing as the quantitative determination processing unit 324 by operating in accordance with the quantitative determination processing program loaded in the TEE trust region 38 of the memory 32, executes processing as the semantic determination processing unit 325 by operating in accordance with the semantic determination processing program loaded in the TEE trust region 38 of the memory 32, executes processing as the i-th layer processing unit 326 by operating in accordance with the i-th layer processing program loaded in the TEE trust region 38 of the memory 32, and executes processing as the determination notification processing unit 334 by operating in accordance with the determination notification processing program loaded in the TEE trust region 38 of the memory 32.

The GPU 39 executes processing as the i-th layer processing unit 312 by operating in accordance with the i-th layer processing program loaded in the normal region of the memory 32. The TEE-compatible CPU 11 executes processing as the encryption processing unit 1302 by operating in accordance with the encryption processing program loaded in the TEE trust region 17 of the memory 12. The CPU 21 executes processing as an inference result display unit 201 by operating in accordance with the inference result display program loaded in the memory 22, and executes processing as the decryption processing unit 202 by operating in accordance with the decryption processing program loaded in the memory 22.

Figure 4:
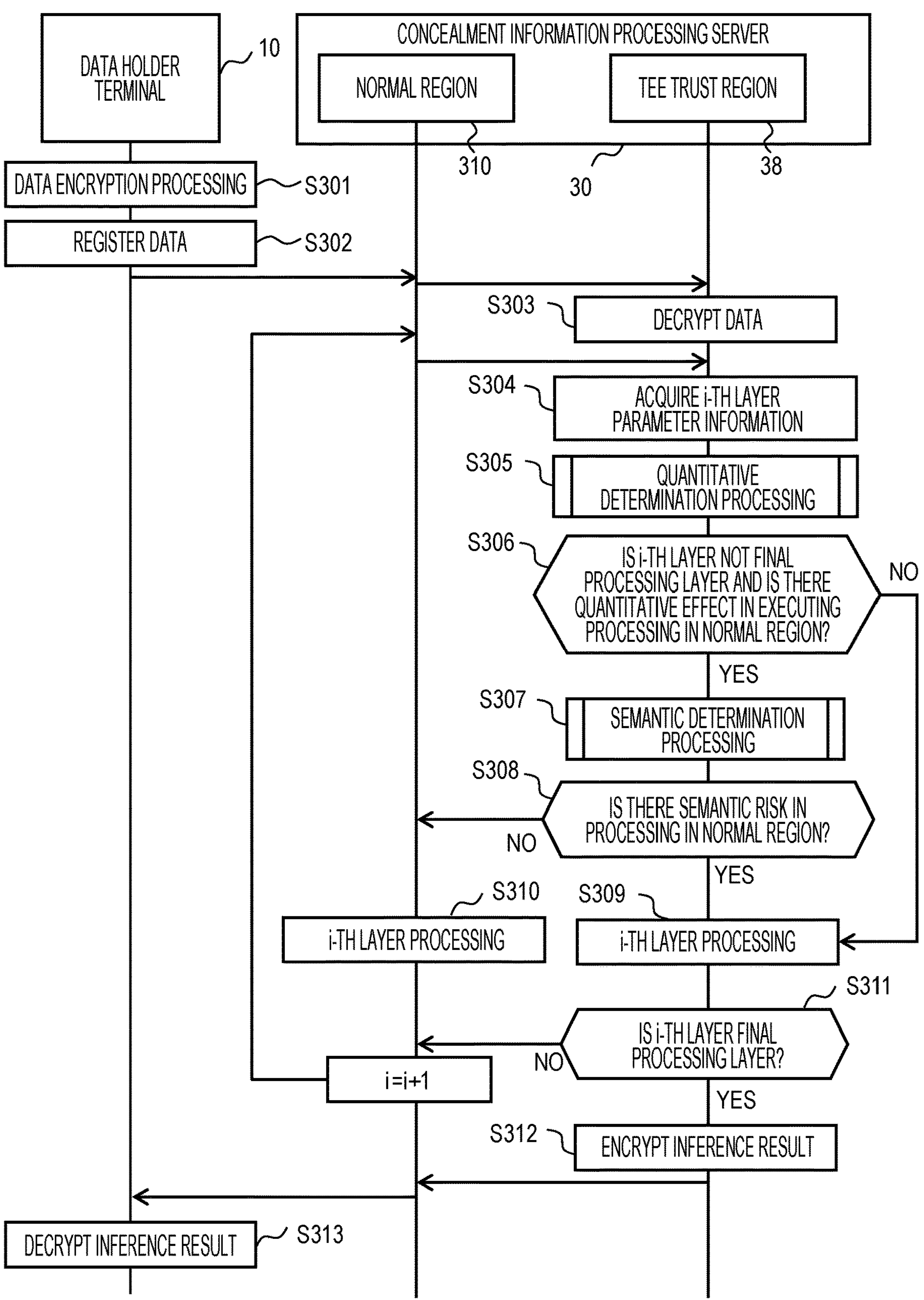
FIG. 4 is a sequence diagram illustrating an example of the data processing flow of concealment inference processing in the first embodiment.

The data processing flow of the concealment inference processing according to the first embodiment will be described below with reference to FIGS. 3 and 4. FIG. 4 is a sequence diagram illustrating an example of the data processing flow of concealment inference processing. First, the encryption processing unit 102 of the data holder terminal 10 generates encrypted data 103 (S301) by encrypting data 101 including confidential information, and registers the data (S302) by transmitting the encrypted data 103 to the concealment information processing server 30. Upon receiving the encrypted data 103, the concealment information processing server 30 inputs it to the TEE trust region 38. The decryption processing unit 322 in the TEE trust region 38 decrypts the encrypted data 103, thereby generating data 323 (S303).

The quantitative determination processing unit 324 acquires parameter information 315 or parameter information 333 including the network configuration in an AI model of deep learning to be used for a next i-th layer (first layer in the first time) processing of the CNN, as well as filter information and weight information (S304). The quantitative determination processing unit 324 executes quantitative determination processing on the basis of the data 323 and the acquired parameter information (S305). Details of the quantitative determination processing will be described later.

In the quantitative determination processing, the quantitative determination processing unit 324 determines whether or not the i-th layer is the final layer of the multilayer processing and whether there is a quantitative effect by executing the processing in the normal region (S306). If the quantitative determination processing unit 324 determines that the i-th layer is not the final layer of the multilayer processing and has a quantitative effect (S306: YES), the semantic determination processing unit 325 executes the semantic determination processing (S307). Details of the semantic determination processing will be described later.

If the quantitative determination processing unit 324 determines that the i-th layer is the final layer of the multilayer processing or there is no quantitative effect (S306: YES), the i-th layer processing unit 326 of the TEE trust region 38 generates intermediate data 327 (S309) by executing the data processing of the i-th layer of the CNN on the basis of the data 323 and the parameter information 333 used for the i-th layer processing, and proceeds to step S311.

In the semantic determination processing, the semantic determination processing unit 325 determines whether there is a risk (or whether there is a large risk) of leakage of secret information if the data processing of the i-th layer of the CNN is processed in the normal region 310 (S308). If the semantic determination processing unit 325 determines that there is a risk (or there is a large risk) of leakage of the secret information if the data processing of the i-th layer of CNN is processed in the normal region 310 (S308: YES), the processing proceeds to step S309.

If the semantic determination processing unit 325 determines that there is no risk (or there is a small risk) in processing the data processing of the i-th layer of the CNN in the normal region 310 (S308: NO), the i-th layer processing unit 312 of the normal region 310 generates intermediate data 313 (S310) by executing the data processing of the i-th layer of the CNN on the basis of the data 323 and the parameter information 315 used for the i-th layer processing, and increments i, and the processing proceeds to step S304.

The i-th layer processing unit 326 of the TEE trust region 38 determines whether the i-th layer of the immediately preceding i-th layer processing is the final processing layer (S311). If determining that the i-th layer of the immediately preceding i-th layer processing is not the final processing layer (S311: NO), the i-th layer processing unit 326 of the TEE trust region 38 increments i, and transmits the intermediate data 327, which is the processing result, to the quantitative determination processing unit 324 together with i, and the processing returns to step S304.

If determining that the i-th layer of the immediately preceding i-th layer processing is the final processing layer (S311: YES), the i-th layer processing unit 326 of the TEE trust region 38 generates an encryption inference result 330 (S312) by the encryption processing unit 329 of the TEE trust region 38 encrypting, with the encryption key 332, an inference result 328, which is the processing result of the final layer output by the i-th layer processing unit 326 of the TEE trust region 38.

The encryption processing unit 329 of the TEE trust region 38 outputs the encryption inference result 330 to the normal region 310, and the i-th layer processing unit 312 of the normal region 310 transmits the encryption inference result 330 to the processing result user terminal 20. The decryption processing unit 202 of the processing result user terminal 20 generates an inference result by decrypting the received encryption inference result 330 with the encryption key 204, and the inference result display unit 201 displays the inference result on the display device 25.

Figure 5:
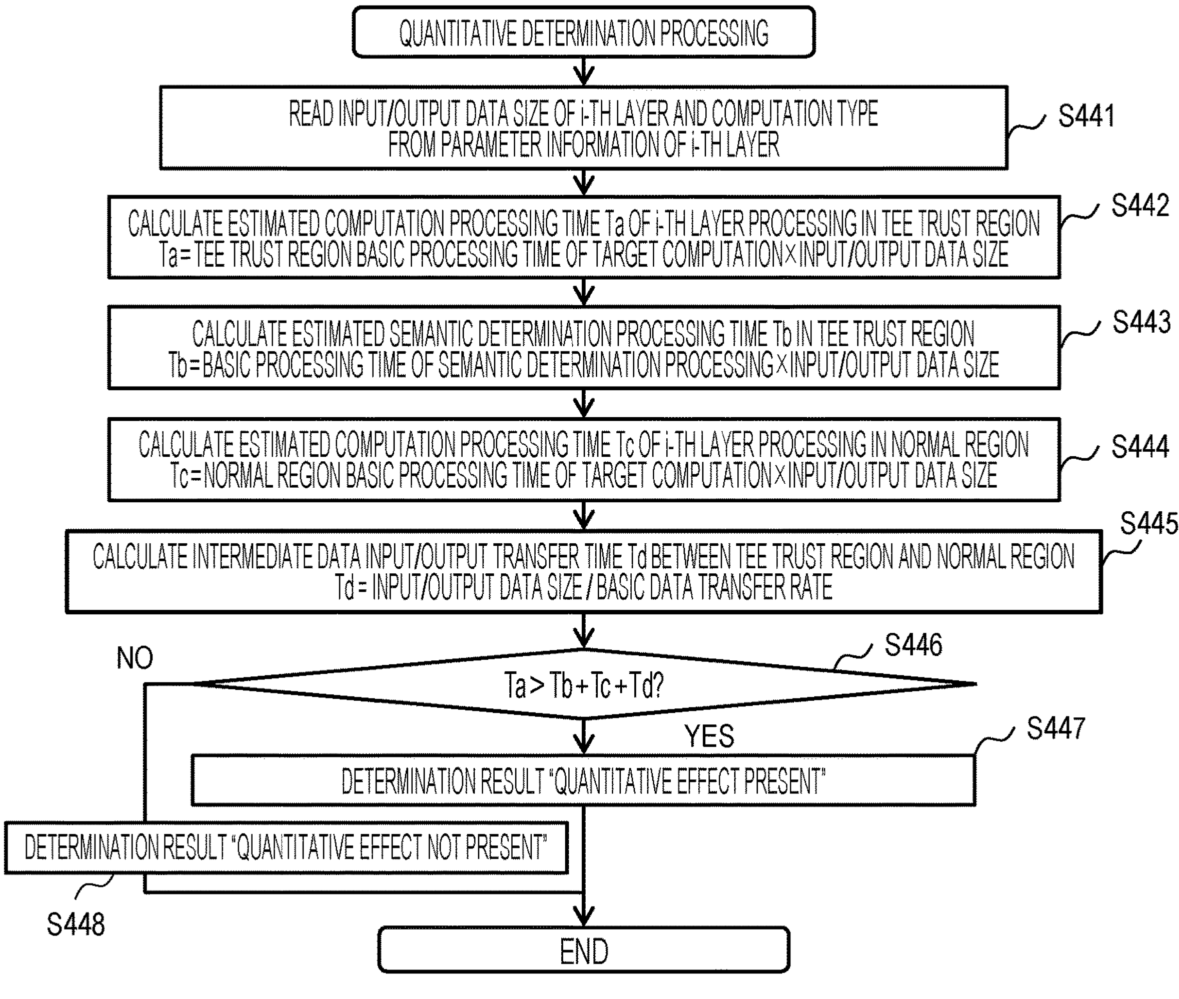
FIG. 5 is a flowchart illustrating an example of quantitative determination processing in the first embodiment.

FIG. 5 is a flowchart illustrating an example of the quantitative determination processing. The quantitative determination processing unit 324 reads the parameter information of the i-th layer in the parameter information 333, and further specifies an input/output data size (input data size from the normal region 310 to the TEE trust region 38 and output data size from the TEE trust region 38 to the normal region 310) of the i-th layer and the type of computation performed in the i-th layer (S441).

TEE trust region basic processing time (processing time per unit data size in a case where the i-th layer processing is performed in the TEE trust region 38), normal region basic processing time (processing time per unit data size in a case where the i-th layer processing is performed in the normal region 310), and basic processing time of the semantic determination processing in the TEE trust region (processing time per unit data size of the semantic determination processing) may be determined in advance, or may be calculated from the specified parameter. A basic data transfer speed (transfer speed per unit data size) between the TEE trust region 38 and a normal region 320 is determined in advance.

The quantitative determination processing unit 324 calculates a predicted value Ta of the calculation time required for the i-th layer processing when the next i-th layer processing is executed in the TEE trust region 38 (S442). Ta is defined by, for example, the product of the TEE trust region basic processing time of the target computation (specified type of computation) and the input/output data size.

The quantitative determination processing unit 324 calculates a predicted value Tb of the calculation time required for the semantic determination processing when the semantic determination processing is executed in the TEE trust region 38 (S443). Tb is defined by, for example, the product of the basic processing time of the semantic determination processing and the input/output data size.

The quantitative determination processing unit 324 calculates a predicted value Tc of the calculation time required for the i-th layer processing when the i-th layer processing is executed in the normal region 310 (S444). Tc is defined by, for example, the product of the normal region basic processing time of the target computation and the input/output data size.

The quantitative determination processing unit 324 calculates an intermediate data input/output transfer time predicted value Td between the TEE trust region 38 and the normal region 310 (S445). Td is defined by, for example, the quotient obtained by dividing the input/output data size by the basic data transfer speed.

The quantitative determination processing unit 324 determines whether Ta is larger than Tb+Tc+Td (S446). Ta is processing time when the i-th layer processing is executed in the TEE trust region 38, and Tb+Tc+Td is processing time when the i-th layer processing is executed in the normal region 310.

When determining that Ta is larger than Tb+Tc+Td (S446: YES), the quantitative determination processing unit 324 determines that there is a quantitative effect because the processing time is shorter when the i-th layer processing is executed in the normal region 310 than when the i-th layer processing is executed in the TEE trust region 38 region (S447), inputs the data to the semantic determination processing unit 325, and ends the quantitative determination processing.

When determining that Ta is smaller than Tb+Tc+Td (S446: NO), the quantitative determination processing unit 324 determines that there is no quantitative effect because the processing time is shorter when the i-th layer processing is executed in the TEE trust region 38 than when the i-th layer processing is executed in the normal region 310 region (S448), inputs the data and the parameter information used for the i-th layer processing to the i-th layer processing unit 326 of the TEE trust region 38, and ends the quantitative determination processing.

For example, in a case where the processing of the normal region 320 can be executed at high speed by an acceleration chip such as the GPU 39, there is a case where the processing can be executed at high speed on the order of about 100 times the processing of the TEE trust region 38, and thus, there is a case where Tc becomes extremely smaller than Ta. In this case, since Tb+Tc+Td is extremely highly likely to become smaller than Ta, only the semantic determination processing may be performed with the quantitative determination processing omitted.

On the other hand, in a case where the processing in the normal region cannot be executed at high speed, the difference between Ta and Tc is small, and depending on Tb and Td, Ta becomes smaller than Tb+Tc+Td.

The predicted values Ta to Td calculated by the quantitative determination processing unit 324 (and/or the determination result by the quantitative determination processing unit 324) may be notified to the user of the concealment information processing server 30 by the determination notification processing unit 334 displaying the predicted values Ta to Td on the display device 35, may be notified to the user of the data holder terminal 10 by the determination notification processing unit 334 displaying the predicted values Ta to Td on the display device 15 of the data holder terminal 10, and may be notified to the user of the processing result user terminal 20 by the determination notification processing unit 334 displaying the predicted values Ta to Td on the display device 25 of the processing result user terminal 20. In this case, the input of a determination result (that is, the determination result in step S446) as to whether or not there is a quantitative effect for the notification may be received from the user via the input device 36, the input device 16, or the input device 26, and the quantitative determination processing unit 324 may determine whether or not to execute the semantic determination processing in accordance with the determination result.

The quantitative determination processing unit 324 executes the quantitative determination only for the i-th layer in one quantitative determination processing, but may execute the quantitative determination processing for a plurality of layers (quantitative determination processing of all layers in the quantitative determination processing of the first time, for example) at a time.

Figure 6:
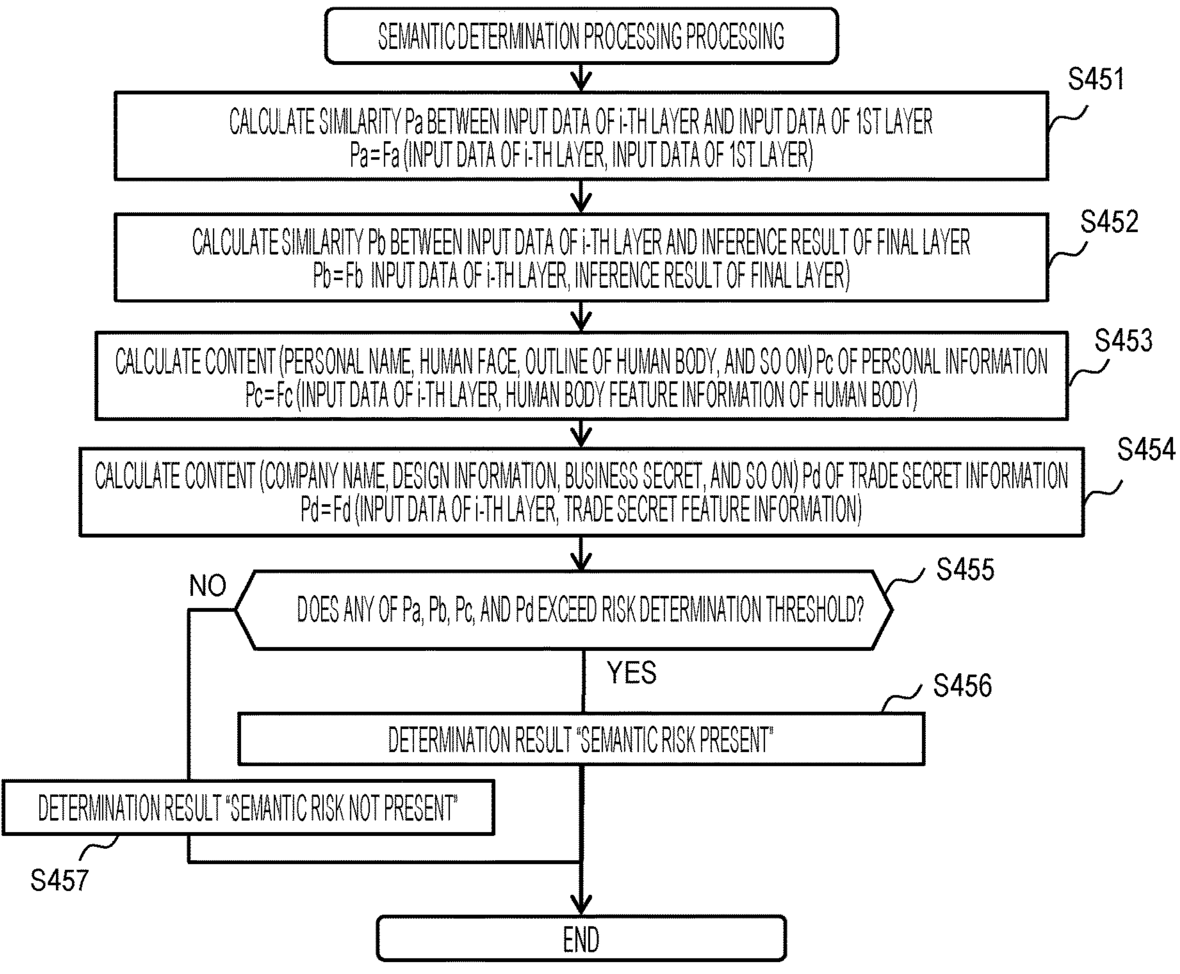
FIG. 6 is a flowchart illustrating an example of semantic determination processing in the first embodiment.

FIG. 6 is a flowchart illustrating an example of the semantic determination processing. The semantic determination processing unit 325 of the TEE trust region 38 compares the input data of the i-th layer with the input data of the first layer, and calculates similarity Pa between the input data of the i-th layer and the input data of the first layer (S451). The semantic determination processing unit 325 calculates similarity Pb between the input data of the i-th layer and the inference result of the final layer on the basis of the input data of the i-th layer and the parameter information 333 (S452).

The semantic determination processing unit 325 calculates content (for example, personal name, human face, outline of human body, and so on) Pc of personal information in the input data of the i-th layer (S453). The semantic determination processing unit 325 calculates content (for example, company name, design information, image of component, business confidentiality, parameter information of deep learning model, and so on) of trade secret information in the input data of the i-th layer (S454). That is, in steps S452 and S453, the semantic determination processing unit 325 determines how much secret information is included in the input data of the i-th layer.

The semantic determination processing unit 325 compares Pa, Pb, Pc, and Pd with predetermined thresholds (for Pa, Pb, Pc, and Pd, respectively), and determines whether any of them exceeds the threshold (S455). If determining that any of Pa, Pb, Pc, and Pd exceeds the threshold (S455: Yes), the semantic determination processing unit 325 determines that there is a semantic risk (or a semantic risk is large) (S456), inputs the data and the parameter information used for the i-th layer processing to the i-th layer processing unit 326 of the TEE trust region 38, and ends the semantic determination processing.

If determining that none of Pa, Pb, Pc, and Pd exceeds the threshold (S455: No), the semantic determination processing unit 325 determines that there is no semantic risk (or the semantic risk is small) (S457), inputs the data and the parameter information used for the i-th layer processing to the i-th layer processing unit 312 of the normal region 310, and ends the semantic determination processing.

Pa to Pd calculated by the semantic determination processing unit 325 (and/or the determination result by the semantic determination processing unit 325) may be notified to the user of the concealment information processing server 30 by the determination notification processing unit 334 displaying the predicted values Ta to Td on the display device 35, may be notified to the user of the data holder terminal 10 by the determination notification processing unit 334 displaying the predicted values Ta to Td on the display device 15 of the data holder terminal 10, and may be notified to the user of the processing result user terminal 20 by the determination notification processing unit 334 displaying the predicted values Ta to Td on the display device 25 of the processing result user terminal 20.

In this case, the input of a determination result (that is, the determination result in step S455) as to whether or not there is a semantic risk (or whether the semantic risk is large or small) for the notification may be received from the user via the input device 36, the input device 16, or the input device 26, and the semantic determination processing unit 325 may determine whether to execute the i-th layer processing in the normal region 320 or to execute the i-th layer processing in the TEE trust region 38 in accordance with the determination result.

In the semantic determination processing of FIG. 6, the semantic determination processing unit 325 calculates all the values of Pa to Pd and uses them for determination, but may calculate only some values (for example, only Pc or the like) and use them for determination. In step S456, the semantic determination processing unit 325 determines whether any of Pa to Pd exceeds the threshold, but may determine, for example, whether all of Pa to Pd exceed the threshold, or may determine whether the total value (may be a total value of weighting by a predetermined weight) of Pa to Pd exceeds a predetermined value.

The concealment information processing server 30 determines whether to execute the i-th layer processing in the normal region 310 or to execute the i-th layer processing in the TEE trust region 38 for each layer, but when determining that the processing of the i-th layer is executed in the normal region 310, may omit the quantitative determination processing and the semantic determination processing for the i+1-th and subsequent layers, and determines that all processing of the i+1-th and subsequent layers are executed in the normal region 310.

(1-3) Effects of First Embodiment

As described above, when executing, for the input information, the inference processing including processing of a plurality of layers such as CNN, the concealment information processing server 30 according to the first embodiment executes the quantitative determination processing before executing the data processing of each layer. In the quantitative determination processing, the concealment information processing server 30 calculates a predicted value of the data processing time of a layer in the TEE trust region 38 of the layer to be executed next and a predicted value of the data processing time of the layer in the normal region 310 including the determination time of the semantic determination processing and the data input/output time, and performs the data processing of each layer in a region where the predicted value of the data processing time is smaller, so that the data processing time can be shortened (processing overhead of outputting intermediate data in the TEE trust region 38 to the normal region 310 can be reduced).

When determining that it is more efficient (data processing time is short) to output data to the normal region 310 and process the data by the quantitative determination processing, the concealment information processing server 30 executes the semantic determination processing in the TEE trust region 38 before outputting the data to the normal region 310. In the semantic determination processing, the concealment information processing server 30 determines the presence or absence of confidential information such as an image of an individual, an image of a component, or character information corresponding to personal information and a trade secret, and, only in a case where there is no (or low) risk of leakage of the confidential information, outputs the data to the normal region 310 and causes the processing to be executed in the normal region 310. This allows the concealment information processing server 30 to suppress leakage of the confidential information into the normal region 310 and to protect the confidential information from the cyber attacker who has taken over, by the cyberattack, the system administrator of the concealment information processing server 30 and the administrator authority of it.

(2) Second Embodiment

(2-1) Configuration of Concealment Information Processing System

Description about content similar to that of the first embodiment will be omitted, and differences will be mainly described. A system configuration example of the concealment information processing system 1 according to the second embodiment is similar to that in FIG. 1, and a hardware configuration example is similar to that in FIG. 2.

In the concealment information processing system 1 according to the second embodiment, the processing result user terminal 20 transmits, to the concealment information processing server 30, a processing request for inference processing using the confidential information held by the plurality of data holder terminals 10. On the basis of the processing request, the concealment information processing server 30 conceals and transmits, to each data holder terminal 10, parameter information including the network configuration in an AI model of deep learning, which is a trade secret owned on the concealment information processing server 30, and filter information and weight information.

Each data holder terminal 10 performs inference/learning processing using confidential information such as personal information held by each data holder terminal 10 while keeping parameter information of the trade secret of the concealment information processing business operator concealed, and provides the processing result to the processing result user terminal 20. Each data holder terminal 10 may perform other optional data processing in addition to the inference processing and the learning processing.

(2-2) Data Flow of Distributed Concealment Inference Processing

Figure 7:
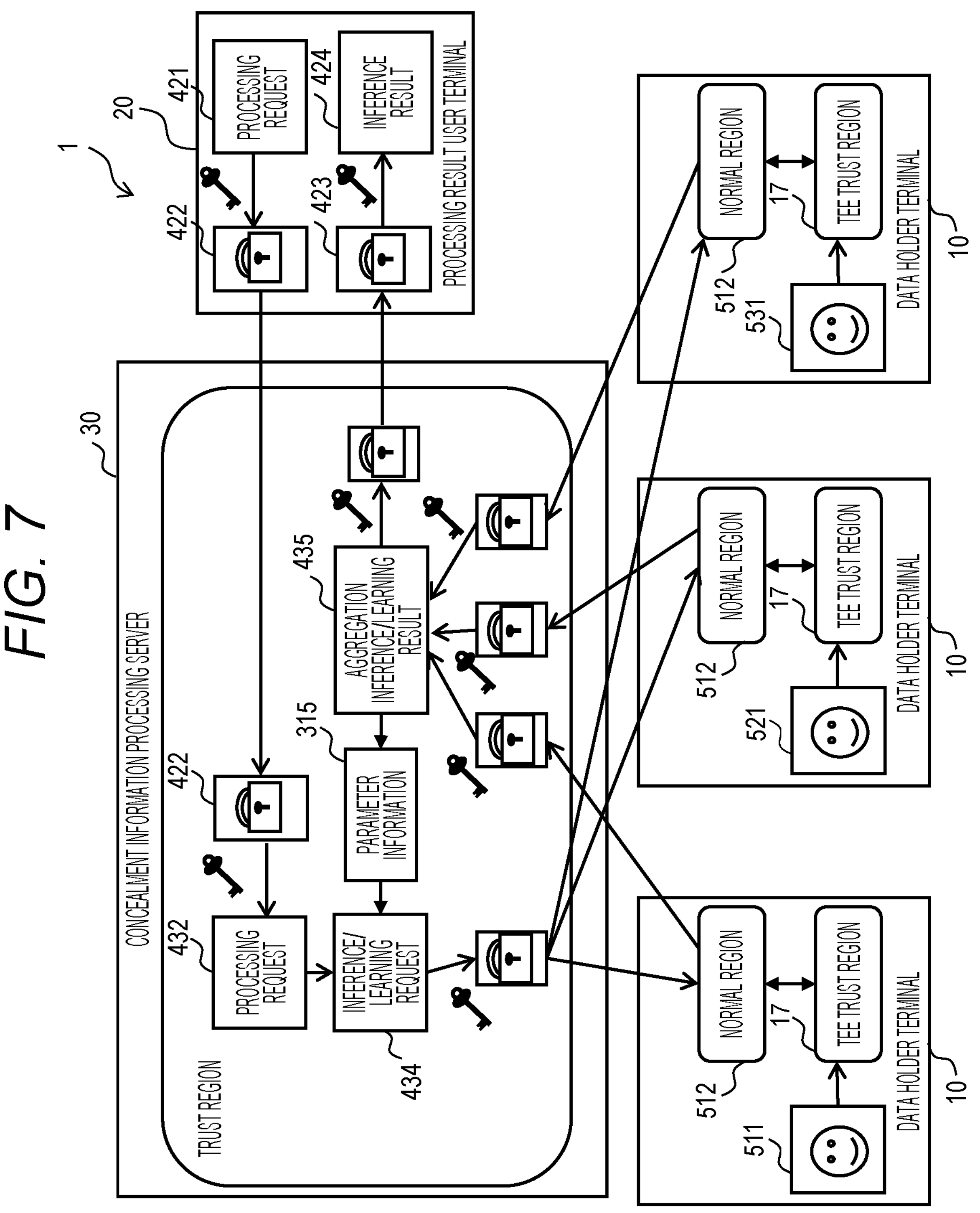
FIG. 7 is an explanatory diagram illustrating an example of a data flow of distributed concealment inference/learning processing in a second embodiment.

FIG. 7 is an explanatory diagram illustrating an example of a data flow of distributed concealment inference/learning processing. The functional units illustrated in FIG. 3 are partially omitted. Each data holder terminal 10 of the second embodiment has a functional unit and information included in the concealment information processing server 30 of FIG. 3, and can execute the concealment inference processing illustrated in FIGS. 3 and 4. That is, in the second embodiment, each data holder terminal 10 can function as the concealment information processing server 30 in the first embodiment. The concealment information processing server 30 in the second embodiment needs not include the normal region 310.

First, the CPU 21 of the processing result user terminal 20 generates an encryption processing request 422 by encrypting the processing request including the confidential information of the processing result user, and transmits the encryption processing request 422 to the concealment information processing server 30.

Next, the decryption processing unit 322 of the concealment information processing server 30 decrypts the received encryption processing request 422 on the TEE trust region 38, generates and encrypts an inference/learning request 434 including the parameter information 315, which is a trade secret of the concealment information processing business operator, and processing request 432 on the basis of the content of the decrypted processing request 432, and transmits the inference/learning request 434 to each data holder terminal 10 on the basis of the content of the processing request 432 (the processing request includes information for identifying the data holder terminal 10).

Next, the CPU 11 of each data holder terminal 10 decrypts the received inference/learning request 434 in each TEE trust region 17. Furthermore, by using the parameter information in which the inference/learning request 434 includes confidential information 511, confidential information 521, and confidential information 531 of each data holder in the TEE trust region 17, the CPU 11 of each data holder terminal 10 executes the concealment inference processing illustrated in FIGS. 3 and 4, encrypts the inference/learning result, and transmits the encrypted inference/learning result to the concealment information processing server 30.

Here, in the second embodiment, when each data holder terminal 10 executes the concealment inference processing of FIGS. 3 and 4, the data 101 including the confidential information of the data holder that is the concealment target in FIG. 3 in the first embodiment corresponds to the inference/learning request 434 including the processing request 432 and parameter information 433 that are the concealment target in the second embodiment.

In the second embodiment, similarly to the parameter information 315 input from the normal region 310 to the TEE trust region 38 in FIG. 3 in the first embodiment, each data holder terminal 10 inputs the confidential information 511, the confidential information 521, and the confidential information 531 of each data holder from a normal region 512 to the TEE trust region 17, and executes processing in and after the quantitative determination processing. The inference/learning request 434 may be other data processing.

Next, the decryption processing unit 322 of the concealment information processing server 30 decrypts, in the TEE trust region, the encrypted inference result received from each data holder terminal 10, then aggregates the decrypted inference results to generate, encrypt, and transmit, to the processing result user terminal 20, an aggregation inference/learning result 435. In a case where the inference/learning request 434 is a learning request, the decryption processing unit 322 may update the parameter information 315 using the aggregation inference/learning result 435. In the end, the CPU 21 of the processing result user terminal 20 decrypts the encrypted aggregation inference/learning result to obtain an inference/result 424.

(2-3) Effects of Second Embodiment

As described above, on the basis of the processing request of inference/learning processing using the confidential information of the plurality of data holder terminals 10 from the processing result user terminal 20, the concealment information processing system 1 according to the second embodiment transmits, to each data holder terminal 10, the parameter information owned on the concealment information processing server 30 by the concealment information processing business operator, performs inference/learning processing using the confidential information such as personal information held by each data holder terminal 10, and provides the processing result to the processing result user terminal 20. Due to this, the concealment information processing system 1 according to the second embodiment achieves the following effects.

First, since the concealment information processing server 30 and each data holder terminal 10 decrypt and process the processing request of the processing result user terminal 20 only in the TEE trust region, the processing request can be concealed to the concealment information processing business operator and each data holder.

Since each data holder terminal 10 decrypts, only in the TEE trust region, the parameter information including the network configuration in the AI model of deep learning, which is a trade secret owned on the concealment information processing server 30 by the concealment information processing business operator, and the filter information and the weight information, and executes the concealment inference processing of FIGS. 3 and 4, it is possible to improve the processing efficiency of the deep learning inference processing in each data holder terminal 10 while keeping the trade secret concealed to each data holder.

Then, since each data holder terminal 10 performs the inference/learning processing without taking confidential information such as personal information of each data holder out of each data holder terminal 10, it is possible to conceal the confidential information to the concealment information processing business operator and the processing result user.

As described above, according to the distributed concealment inference processing executed by the concealment information processing system 1 of the second embodiment, the data holder, the concealment information processing business operator, and the processing result user can perform the concealment inference/learning processing combining the data of a plurality of data holders while keeping each piece of confidential information concealed to the other two.

The present invention is not limited to the above-described embodiments, and includes various modifications and equivalent configurations within the scope of the appended claims. For example, the above-described embodiments have been described in detail for easy understanding of the present invention, and the present invention is not necessarily limited to those having all the described configurations. A part of the configuration of a certain embodiment may be added, deleted, or replaced with another configuration.

Some or all of the above-described configurations, functions, processing units, processing means, and the like may be achieved by hardware by being designed as an integrated circuit or the like, or may be achieved by software by a processor interpreting and executing a program for achieving each function.

Information such as a program, a table, and a file for achieving each function can be stored in a storage device such as a memory, a hard disk, and a solid state drive (SSD), or a recording medium such as an IC card, an SD card, and a DVD.

In the drawings, control lines and information lines considered to be necessary for description are illustrated, and not all control lines and information lines necessary for implementation are illustrated. In reality, almost all the configurations may be considered mutually connected.

The present invention can achieve a similar effect also in a case of concealing and providing, to an external organization or the like, confidential information that is highly confidential and restricted from being disclosed to the outside of a company by internal rules or the like, such as business secrets in addition to personal information.

The present invention can improve processing efficiency of advanced deep learning or the like while keeping personal information and trade confidential information concealed in a plurality of organizations that handle confidential information such as personal information such as customer information and medical information as well as business secret, and thus can be widely applied to information processing systems for public and private sector services that cooperate with various confidential information.

REFERENCE SIGNS LIST

1 concealment information processing system
10 data holder terminal
11 CPU
12 memory
13 auxiliary storage device
14 network interface
17 TEE trust region
20 processing result user terminal
30 concealment information processing server
31 CPU
32 memory
33 auxiliary storage device
34 network interface
35 display device
36 input device
38 TEE trust region
310 normal region
312 i-th layer processing unit
315 parameter information
324 quantitative determination processing unit
325 semantic determination processing unit
326 i-th layer processing unit
333 parameter information
334 determination notification processing unit

The invention claimed is:

1. An information processing apparatus that executes machine learning by a plurality of processing layers, the information processing apparatus, comprising:

a processor; and a memory, wherein the memory includes a normal region and an isolation region isolated from the normal region, the normal region holds a parameter of the machine learning, the isolation region holds input data to an i-th layer included in the plurality of processing layers and a parameter of the machine learning, and the processor:

executes semantic determination processing of determining whether there is a risk in executing processing of the i-th layer for the input data in the normal region on a basis of a content of secret information of the input data in the isolation region, when determining that there is the risk, executes the processing of the i-th layer for the input data on a basis of the parameter held by the isolation region in the isolation region, when determining that there is no risk, outputs the input data to the normal region, and executes the processing of the i-th layer for the input data on a basis of the parameter held by the normal region in the normal region, executes quantitative determination processing of determining which of a processing time in a case of executing processing of the i-th layer for the input data in the isolation region or a processing time in a case of executing processing of the i-th layer for the input data in the normal region is shorter, on a basis of an input/output data size of the input data and the parameter held in the isolation region, in the isolation region, when determining, in the quantitative determination processing, that the processing time is shorter in the case of executing the processing of the i-th layer for the input data in the isolation region, executes the processing of the i-th layer for the input data on a basis of the parameter held by the isolation region in the isolation region without executing the semantic determination processing, and when determining, in the quantitative determination processing, that the processing time is shorter in the case of executing the processing of the i-th layer for the input data in the normal region, executes the semantic determination processing.

2. The information processing apparatus according to claim 1, wherein the secret information of the input data includes at least one of personal information of the input data and a trade secret of the input data.

3. The information processing apparatus according to claim 1, wherein the isolation region holds initial data input to a first layer of the plurality of processing layers, and wherein the processor, in the semantic determination processing, calculates first similarity between the input data and the initial data, calculates second similarity between the input data and a processing result by a final layer of the plurality of processing layers on a basis of a parameter held by the isolation region, and determines whether there is the risk on a basis of the first similarity and the second similarity.

4. The information processing apparatus according to claim 3, wherein the information processing apparatus is connected to an input device and a display device, and the processor:

displays the first similarity and the second similarity on the display device, receives input of a determination result as to whether or not there is the risk via the input device, and determines, as a determination result of the semantic determination processing, the determination result whose input has been received.

5. The information processing apparatus according to claim 1, wherein the isolation region holds:

information indicating first processing time, which is processing time of the machine learning per unit data size in the isolation region, information indicating second processing time, which is processing time of the machine learning per unit data size in the normal region, and information indicating third processing time, which is processing time of the semantic determination processing per unit data size in the isolation region, and on a basis of the input/output data size of the input data, the first processing time, the second processing time, and the third processing time, in the quantitative determination processing, the processor calculates processing time in a case of executing the processing of the i-th layer for the input data in the isolation region and processing time in a case of executing the processing of the i-th layer for the input data in the normal region, and determines which of the processing time in the case of executing the processing of the i-th layer for the input data in the isolation region or the processing time in the case of executing the processing of the i-th layer for the input data in the normal region is shorter on a basis of the calculated processing time.

6. The information processing apparatus according to claim 5, wherein the information processing apparatus is connected to an input device and a display device, and the processor:

displays the calculated processing time on the display device, receives input of a determination result of the quantitative determination processing via the input device, and determines, as a determination result of the quantitative determination processing, the determination result whose input has been received.

7. An information processing method by an information processing server that executes machine learning by a plurality of processing layers, wherein the information processing server includes a processor and a memory, the memory includes a normal region and an isolation region isolated from the normal region, the normal region holds a parameter of the machine learning, and the isolation region holds input data to an i-th layer included in the plurality of processing layers and a parameter of the machine learning, the information processing method comprising:

executing, by the processor, semantic determination processing of determining whether there is a risk in executing processing of the i-th layer for the input data in the normal region on a basis of a content of secret information of the input data in the isolation region;

executing, by the processor, the processing of the i-th layer for the input data on a basis of the parameter held by the isolation region in the isolation region when determining that there is the risk;

outputting, by the processor, the input data to the normal region, and executes the processing of the i-th layer for the input data on a basis of the parameter held by the normal region in the normal region when determining that there is no risk;

executing quantitative determination processing of determining which of a processing time in a case of executing processing of the i-th layer for the input data in the isolation region or a processing time in a case of executing processing of the i-th layer for the input data in the normal region is shorter, on a basis of an input/output data size of the input data and the parameter held in the isolation region, in the isolation region;

when determining, in the quantitative determination processing, that the processing time is shorter in the case of executing the processing of the i-th layer for the input data in the isolation region, executing the processing of the i-th layer for the input data on a basis of the parameter held by the isolation region in the isolation region without executing the semantic determination processing; and when determining, in the quantitative determination processing, that the processing time is shorter in the case of executing the processing of the i-th layer for the input data in the normal region, executing the semantic determination processing.

* * * * *